United States Patent [19]
Speer

[11] Patent Number: 5,711,287
[45] Date of Patent: Jan. 27, 1998

[54] RECIPROCATING SLURRY SAW

[76] Inventor: Radleigh J. Speer, 4104 W. 66th St., Prairie Village, Kans. 66208

[21] Appl. No.: 699,073

[22] Filed: Aug. 14, 1996

[51] Int. Cl.$^6$ ........................................................... B28D 1/06
[52] U.S. Cl. ........................ 125/16.01; 125/17; 83/651.1
[58] Field of Search ............................... 125/16.01, 16.02, 125/12, 21, 16.03, 17; 451/491, 493, 164, 165; 83/651.1, 581.1, 699.21; 384/38, 37, 45, 57, 54

[56] References Cited

U.S. PATENT DOCUMENTS

| | | |
|---|---|---|
| 2,062,862 | 12/1936 | Calame . |
| 2,714,251 | 8/1955 | Mulhall ................................. 83/651.1 |
| 2,963,018 | 12/1960 | Mattson et al. . |
| 3,120,223 | 2/1964 | Burckhardt . |
| 3,263,669 | 8/1966 | Ashley . |
| 3,674,004 | 7/1972 | Grandia et al. ......................... 451/164 |
| 3,678,918 | 7/1972 | Stauffer . |
| 3,845,541 | 11/1974 | Ranieri . |
| 3,889,699 | 6/1975 | Ranieri . |
| 4,188,936 | 2/1980 | Stauffer . |
| 4,253,709 | 3/1981 | Teramachi ................................. 384/45 |
| 4,502,737 | 3/1985 | Osawa ........................................ 384/45 |
| 4,637,738 | 1/1987 | Barkley . |
| 4,995,734 | 2/1991 | Schroeder . |
| 5,033,869 | 7/1991 | Kingston et al. . |
| 5,064,318 | 11/1991 | Cirillo . |
| 5,308,170 | 5/1994 | Yamaguchi et al. . |
| 5,329,825 | 7/1994 | Askins . |
| 5,388,913 | 2/1995 | Cawley et al. . |
| 5,435,649 | 7/1995 | Kuwahara ................................. 384/45 |

FOREIGN PATENT DOCUMENTS 3-234461  10/1991  Japan .

OTHER PUBLICATIONS

Literature of THK Co., of Tokyo, Japan, for Linear Motion Systems, specifically type HSR, exact publication date unknown, but at least one year prior to the filing of the present application.

Linear motion technology guide of Thomson Industries, Inc., of Port Washington, New York, exact publication date unknown, but at least one year prior to the filing of the present application.

Usage manual of Varian of West Germany, for the Varian 7176 Wafering Machine, exact publication date unknown, but at least one year to the filing of the present application.

Sales literature of Sawyer Research Products, Inc. for Multi-blade Wafering Saw, exact publication date unknown, but at least one year prior to the filing of the present application.

(List continued on next page.)

*Primary Examiner*—James G. Smith
*Assistant Examiner*—Derris H. Banks
*Attorney, Agent, or Firm*—Litman, McMahon and Brown, L.L.C.

[57] ABSTRACT

An improved reciprocating saw is designed to compensate for distortion in a reciprocating blade head due to tensioning of a blade pack. The saw incorporates an improved linear rail pair supporting the blade head via four bearing housings. A first pair of bearing mounts which compensate for rotary motion between the blade head and the bearing housings are attached between a respective pair of the bearing housings and one side of the blade head a first blade head side member. A second pair of bearing mounts which compensate for both rotary motion and linear motion between the blade head and the bearing housings are attached between a second respective pair of the bearing housings and the opposite side of the blade head. The inventive bearing mounts thus compensate for bowing of side members of the blade head during blade tensioning. In addition, the improved saw uses a contoured, preloaded front cross member stiffener to both stiffen the front cross member of the blade head and prestress it in the opposite direction from which it will be bowed when the blade pack is tensioned. Finally, contoured, preloaded side member stiffeners can be used to both stiffen the side members and prestress them in a direction opposite from which they will be bowed during blade pack tensioning.

40 Claims, 4 Drawing Sheets

OTHER PUBLICATIONS

Sales literature Shure Manufacturing of Prairie Village, Kansas, for Shure-Cut-Model 20 Abrasive Saw, exact publication date unknown, but at least one year prior to the filing of the present application.

Sales literature of P.R. Hoffman Company of Carlisle, Pennsylvania, for FAC-10 Series Abrasive Saw, exact publication date unknown, but at least one year prior to the filing of the present application.

Sales literature of CSM Corporation of Willouby, Ohio, for CSM81 Wafering Machine, exact publication date unknown, but at least one year prior to the filing of the present application.

Sales literature of Kuowa Rika Co., Ltd. of Tokyo, Japan, for Multi Blade Slicing Machine, exact publication date unknown, but at least one year prior to the filing of the present application.

Sales catalog of Meyer Burger, for slicing machines, exact publication date unknown, but at least one year prior to the filing of the present application.

Installation, Operation and Maintenance Manual of Varian/Lexington Vacuum Division, of Lexington, Massachusetts, for 7186 Wafering Machine, exact publication date unknown, but at least one year prior to the filing of the present application.

Sales literature of Specialized Grinding Systems of Montville, New Jersey, for Meyer + Burger AG Multi Blade Wafering Machine, exact publication date unknown, but at least one year prior to the filing of the present application.

Sales literature of Yokoyama, for Multi Blade Slice Machine, exact publication date unknown, but at least one year prior to the filing of the present application.

Sales literature of Shure Manufacturing of Merriam, Kansas, for Abrasive Saw Model 2088, exact publication date unknown, but at least one year prior to the filing of the present application.

PRIOR ART

RECIPROCATING SLURRY SAW

BACKGROUND OF INVENTION

1. Field of Invention

This invention relates to improvements in reciprocating saws, which are sometimes called slurry saws, wafering machines, multiple blade power hack saws, or reciprocating slurry saws. Reciprocating saws are used to cut hard materials into thin slices or wafers. The hard materials cut by such saws include quartz, silicon, ferrites, glass, ceramics, germanium, semiconducting crystals, and other hard materials. Frequently, such materials are difficult to cut, yet must be cut or wafered to precise tolerances and dimensions, especially in quartz crystal applications such as frequency control devices, filters, and oscillating devices.

Reciprocating slurry saws are known in the art and typically include a table or base which support a spaced pair of parallel "V's and flats" or linear rails on the top of the base. A blade head is mounted between the V's and flats or linear rails such that the blade head is slidable along the V's and flats or linear rails. The blade head includes a pair of parallel side members and orthogonal front and rear cross members which together define a generally rectangular cutting area within which is mounted a blade pack consisting of a plurality of parallel spaced apart steel blades which are mounted, stretched, and tensioned with considerable force between the front and rear cross members. The blade head is supported on the rails by a plurality of linear rail bearings in bearing housings which are connected to the side members of the blade head and slidably mounted on the linear rails to allow reciprocation of the blade head along the rails. A motor typically turns a drive wheel, to which is attached a first end of an eccentrically mounted pitman arm with a second end of the arm being attached to the blade head to reciprocate the blade head. An abrasive slurry, such as fine silicon carbide particles suspended in an oil base, is stored in a reservoir and is pumped over the blades and into the cutting area. A work surface supports the hard material within the cutting area and a lift, which can be pneumatically driven, pushes the work surface upward, thus urging the hard material into contact with the reciprocating blades and slurry mix.

The efficiency of the reciprocating saw and the quality of the wafers or slices produced by the saw are sensitively dependent on the tension and, thus, uniform straightness of the plurality of steel blades in the blade pack, as well as on the precision with which the blade head reciprocates. If the blades are not as straight as possible, or if the blade head does not reciprocate smoothly and truly, the wafers or slices will not be cut to the necessary size or tolerances, or may be spoiled and rendered unusable. Furthermore, if the reciprocating motion is imprecise, saw set-up is greatly complicated, various components of the reciprocating saw may be subjected to excessive wear, the saw may require more power for operation, and the achievable operating speed may be slowed.

In order to sufficiently tension and straighten the steel blades within the blade head, the blades must be pulled and stretched with considerable force. This is typically done by securing either end of the blade pack to respective ones of the front and rear cross members. The cross members are then mechanically drawn apart from one another to tension the blade pack in the blade head.

Tensioning of the blade pack transfers considerable force to the front and rear cross members, and, due to their rigid connection with the side members of the blade head, to the side members as well. This force causes the side members to bow slightly outward and the front cross member to bow inward. This distortion and deflection of the blade head members has several undesirable consequences. Since the linear rail bearing housings are rigidly attached to the side members of the blade head, when the side members bend and bow, the linear rail bearing housings become distorted, and the alignment of the linear rail bearing housings with respect to the linear rails changes. This places pressure between the bearings within the housings and the linear rail, which eventually gouges, roughens, scores or pits the linear rails and increases bearing wear and eventually leads to bearing failure. Furthermore, the distortion of the bearing housings reduces the efficiency of the bearings, thus increasing friction during reciprocation of the blade head. This requires increased power to reciprocate the blade head at a certain speed, or, at a set power, can slow or even stop the reciprocation. The path of the reciprocating blades can be altered as well, causing the wafers to be improperly cut or damaged and accelerating blade wear. The bowing of the front cross member and the side cross members also diverts forces applied to tension the blade pack, thus requiring greater force to be exerted on the movable front cross member to achieve the desired blade tension.

2. Description of the Related Art

Various attempts have been made to reduce or correct the above described problems, all with minimal or modest success. The dimensions of the various parts of the blade head have been changed to anticipate the distortion of the side and front members of the blade head, however, at best, this accommodates only very small degrees of misalignment. The linear rail bearing housings have been slightly oversized, or the rails slightly undersized, to accommodate the misalignment resulting from the distortion of the blade head but such adjustments also accommodate only very small degrees of misalignment. Moreover, if there is too much play in the fit of the linear rail bearings on the linear rails, the blade head will not run true or smoothly. Another common way of taking misalignment into account in a reciprocating saw is to set the linear rails farther apart than the actual linear rail bearing centerline distance. This method anticipates a portion of the widening of the blade head due to distortion, but it does not allow for different degrees of blade pack elongation or different sizes of blade packs. The result is shortening of the life of the linear rail and linear rail bearings, poor tracking of the blade head, and decreased overall efficiency. Yet another way to accommodate misalignment is to reduce the tension and straightening forces on the blades, and, thus, reduce the distortion of the blade head. This, of course, reduces the straightness of the blades, causes improperly cut wafers, increases the frequency of damaged wafers, and reduces the life of the blades and blade pack.

It is clear, then, that a need exists for an improved reciprocating saw, and more particularly to such an improved saw which minimizes the adverse effects of distortion of the blade head due to tensioning of the blade pack.

SUMMARY OF THE INVENTION

The present invention is directed to an improved reciprocating saw in which a first pair of bearing mounts are attached onto a respective pair of bearing housings and a first blade head side member, which first pair of bearing mounts allow for relative rotary motion between the side member and the bearing housing during bowing of the first side member. A second pair of bearing mounts are attached onto a respective pair of bearing housings and a second blade head side member, which second pair of bearing mounts allow for relative rotary motion between the second side member and the bearing housing during bowing of the second side member and which are laterally movable toward and away from the second side rail to accommodate for distortion of the overall blade head. In addition, the improved saw uses a contoured, preloaded front cross member stiffener to both stiffen the front cross member of the blade head and prestress it in the direction opposite from which it will be bowed when the blade pack is tensioned. Finally, contoured, preloaded side member stiffeners can be used to both stiffen the side members and prestress them in a direction opposite from which they will be bowed during blade pack tensioning.

OBJECTS AND ADVANTAGES OF THE INVENTION

The objects and advantages of the invention include: to provide an improved reciprocating saw; to provide such a saw with a blade head which incorporates a strengthened and stiffened front cross member to reduce inward bowing of the front cross member; to provide such a saw with a blade head which incorporates a front cross member with a stiffener which is preloaded to further reduce the inward bowing of the front cross member; to provide such a saw which incorporates a blade head with stiffened and, optionally, prestressed side members to reduce the outward bowing of the side members; to provide such a saw which incorporates a blade head with bearing mounts which can rotate to accommodate and adjust for any residual bowing of the side and cross members of the blade head; to provide such a saw which incorporates a blade head with other bearing mounts which both rotate with respect to, and slide laterally toward and away from, one side member of the blade head to accommodate any further residual distortion of the blade head; to provide such a saw which incorporates bearings and bearing housings which are mounted on the blade head so as to run smoothly and truly on the linear rails of the saw, despite the distortion, bending and bowing of the front and side members of the blade head; to provide such a saw which reduces the wear on the linear rail bearings; to provide such a saw which prevents the linear rail bearings from gouging, roughening, scoring, pitting and otherwise damaging the linear rails of the saw; to provide such a saw which has a blade head in which it is easier to tension the blades in the blade head; to provide such a saw which requires less power to operate the blade head and saw; to provide such a saw which does not slow or stop the reciprocation of the blade head; to provide such a saw with increased efficiency and economy of operation; to provide such a saw which reduces the number and frequency of improperly cut wafers or slices; to provide such a saw which reduces the number and frequency of damaged wafers or slices; to provide such a saw which reduces wear on the blades of the saw; to provide such a saw which reduces the wear on the linear rail bearings of the saw; to provide such a saw with increased useful life of the bearings, blades, and linear rails of the saw; to provide such a saw which permits greater tension and stretching to be applied to the blades, and thus permits the wafers or slices to be cut more accurately; to provide such a saw which better maintains the straightness of the tensioned saw blades; and to provide such a saw which is particularly well adapted for its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 4:
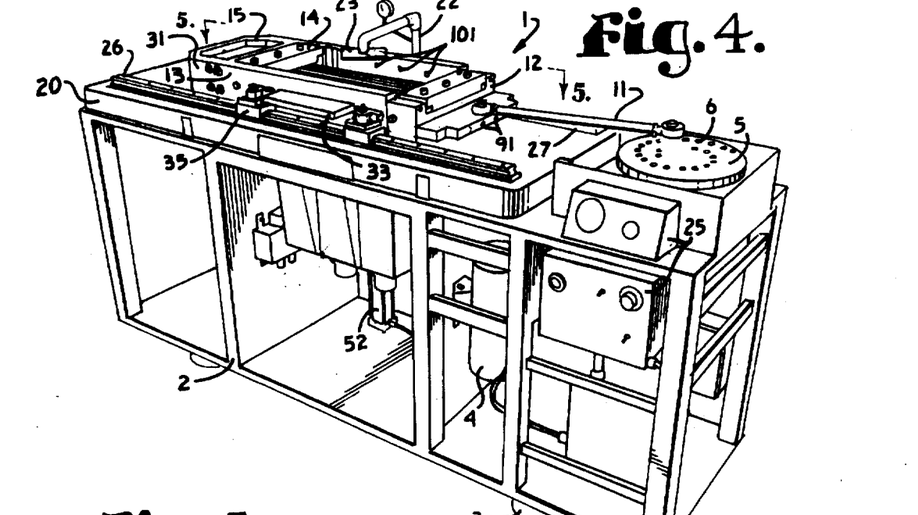
FIG. 4 is a perspective view of a reciprocating slurry saw according to the present invention.
Figure 5:
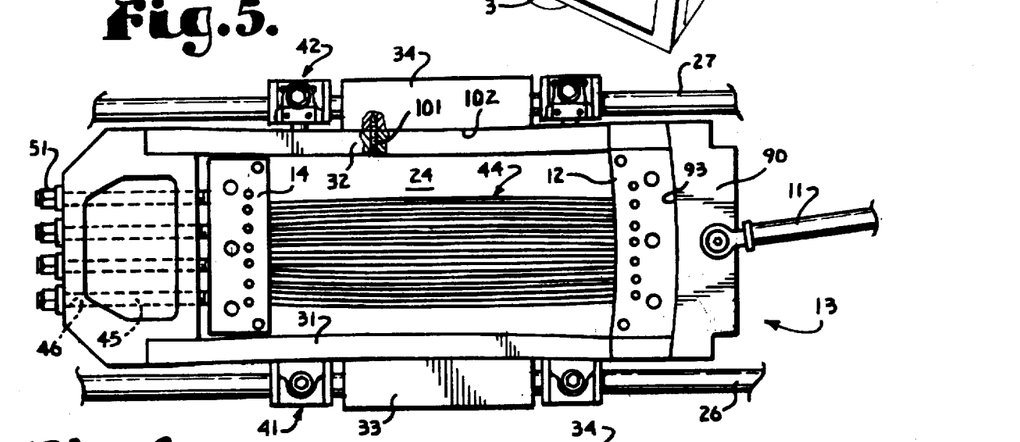
FIG. 5 is a top plan view of a portion of the inventive reciprocating slurry saw of FIG. 4 prior to tensioning of the blade pack, with prestressed blade head front cross and side members which are shown greatly exaggerated for illustrative purposes.
Figure 6:
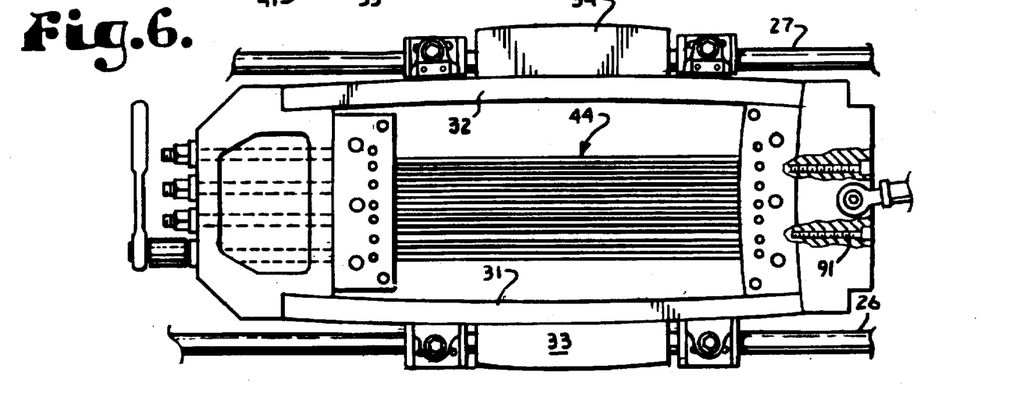
FIG. 6 is a top plan view of a portion of the inventive reciprocating slurry saw after tensioning of the blade pack, and with distortion in the blade head front cross and side members shown greatly exaggerated.

Referring to FIGS. 4-6, a reciprocating slurry saw in accordance with the invention is generally designated as 1. The slurry saw 1 includes a stand 2 with a plurality of supporting feet 3. The stand 2 supports a motor 4 which turns a drive wheel 5. The drive wheel 5 includes a pattern of eccentrically located apertures 6 arranged in a spiral configuration for the selective mounting of a first end of a pitman arm 11. The second end of the pitman arm 11 is attached to a front cross member stiffener 90 which is attached to a front cross member 12 of a blade head, generally indicated at 13. The blade head 13 also includes a rear movable cross member 14 and a rear stationary cross member 15.

The stand 2 also supports a way bed casting 20. A free standing oil slurry reservoir and oil slurry pump (not shown) are used to pump a slurry of oil and abrasive particles through a series of oil slurry feed pipes 22, out of a slurry distribution manifold 23 and over the center of the blade head 13 and into a cutting area 24 formed within the blade head 13. A series of electrical and pneumatic controls 25 are positioned on the side of the stand 2 opposite the oil slurry feed pipes 22. By convention, the side of the stand 2 which supports the controls 25 is called the control side and the side of the stand 2 which supports the oil feed pipes 22 is called the oil side.

A pair of linear bearing rails 26 and 27 are attached to respective opposite sides of the way bed casting 20, running lengthwise along the way bed casting 20. The rails 26 and 27 are precisely positioned such that their spacing along the way bed casting 20 is uniform and parallel.

The blade head 13 also includes a control side member 31 and an oil side member 32, each of which can incorporate stiffeners 33 and 34. The control side member 31 has a pair of bearing housings 35 within which are positioned bearings (not shown) which are designed to operate along the linear rail 26. Each bearing housing 35 on the control side is attached to a respective control side bearing mount 41, which is, in turn, attached to the control side member 31. Similarly, the oil side member 32 has a pair of bearing housings 35 within which are positioned bearings which are designed to operate along the linear rail 27. Each bearing housing 35 on the oil side is attached to a respective oil side bearing mount 42, which is, in turn, mounted to the oil side member 32 in a manner described below. The control side bearing mounts 41 and the oil side bearing mounts 42 will be described in detail below.

The front cross member 12, the rear movable cross member 14 and rear stationary cross member 15, the control side member 31 and the oil side member 32 collectively form the generally rectangular cutting area 24. A blade pack 44, which is comprised of a series of as many as 250 individual low carbon steel blades spaced apart a distance approximately equal to the thickness of desired wafers to be cut from the hard material, is attached at one end to the front cross member 12 and at the opposite end to the rear movable cross member 14. A plurality of tensioning bolts 45 are attached at one end to the rear movable cross member and pass through respective bores 46 in the rear stationary cross member 15. A plurality of tensioning nuts 51 are threaded onto corresponding ones of the tensioning bolts 45. The tensioning nuts are used to draw the rear movable cross member 14 toward the rear stationary cross member 15, and, in so doing, to tension the blade pack 44. Tensioning of the blade pack 44 is necessary to achieve the required degree of rigidity and straightness of individual blades and to maintain precise inter-blade distances within the blade pack 44 to precisely cut wafers from the hard material.

A pneumatically operated cylinder 52 lifts the material to be cut upward via a die set and attachments (not shown) into the cutting area 24 and into contact with the reciprocating blade pack 44.

Figure 1:
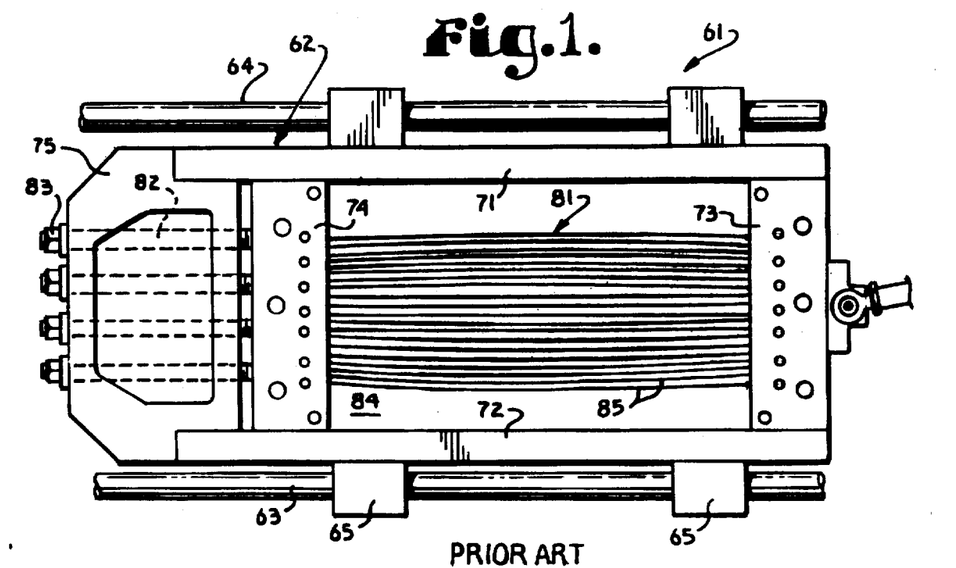
FIG. 1 is a top plan view of a portion of a prior art reciprocating slurry saw prior to tensioning of the blade pack.
Figure 2:
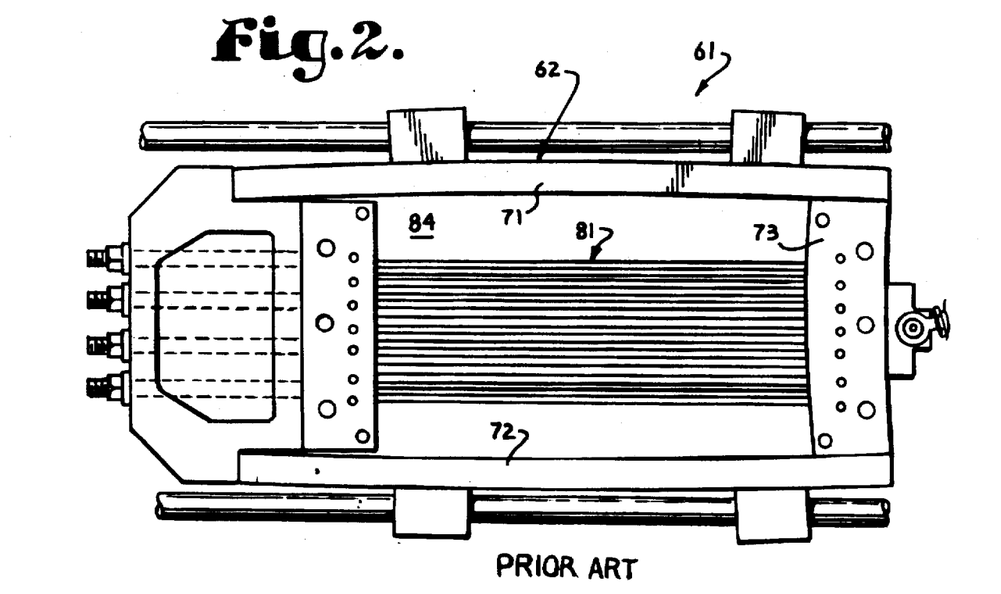
FIG. 2 is a top plan view of a portion of the prior art reciprocating slurry saw of FIG. 1 after tensioning of the blade pack, and with distortion in the blade head front cross member and side members shown greatly exaggerated for illustrative purposes.
Figure 3:
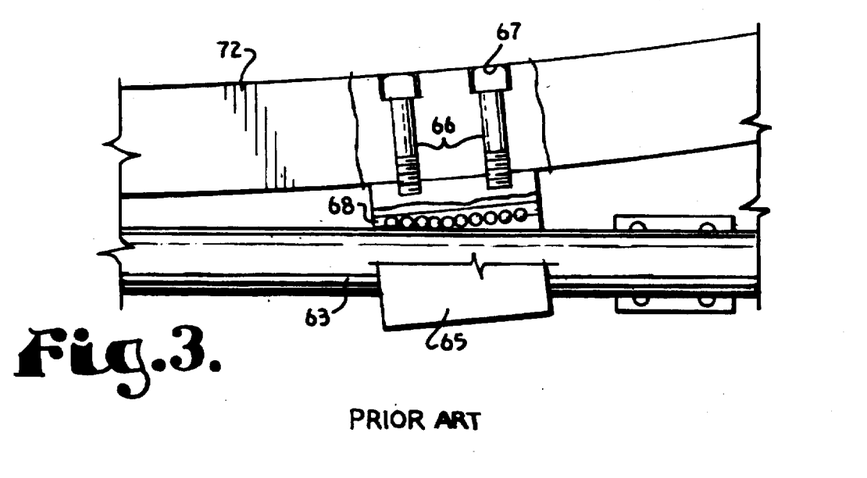
FIG. 3 is a greatly enlarged, fragmentary view of a portion of the prior art slurry saw of FIG. 1, showing one of the control side bearing housings during tensioning of the blade pack, with the housing shown partially broken away to illustrate the attachment to a blade head side member, and with the distortion of the blade head control side member shown greatly exaggerated for purposes of illustration.

As described above, this degree of blade tensioning creates a host of problems in typical reciprocating slurry saws. FIGS. 1 and 2 are side by side representations of a prior art slurry saw 61 incorporating a blade head 62 and a pair of round linear rails 63 and 64. The blade head 62 is attached to the rails 63 and 64 via a plurality of bearing housings 65 which are directly attached, via through bolts 66 (FIG. 3) extending through counterbored bores 67, to side members 71 and 72 of the blade head 62. The blade head 62 is thus reciprocally movable along the rails 63 and 64 via the bearing housings 65 and incorporated bearings 68 (FIG. 3). The blade head 62 is similar to the inventive blade head 13, incorporating many of the same components described above, including a front cross member 73, a rear movable cross member 74, a rear stationary cross member 75, a blade pack 81, tensioning bolts 82 and nuts 83.

FIG. 1 represents the prior art blade head 62 prior to tensioning of the blade pack 81 and FIG. 2 represents the distortion of the blade head 62 (greatly exaggerated) after tensioning. Referring to FIG. 1, prior to blade head tensioning, the side members 71 and 72 and the rear stationary cross member 75 and the front cross member 73 are all straight and undistorted, with the side members 71 and 72 being attached between and being orthogonal to the rear stationary cross member 75 and the front cross member 73. As the blade pack 81 is tensioned by drawing the rear movable cross member 74 toward the rear stationary cross member 75 via nuts 83, the blade head 62 becomes distorted, as shown in FIGS. 2 and 3 (again greatly exaggerated). The front cross member 73 is bowed inward into a cutting area 84 while each of the side members 71 and 72 are bowed outward away from the cutting area 84. This distortion of the blade head 62 creates a number of problems. First, the distortion, by absorbing some of the force directed at blade pack tensioning, means that greater force is required to achieve the required blade pack tension than would be otherwise required. Second, and more importantly, the distortion of the front cross member 73 also distorts the spacing of individual blades 85 within the blade pack 81. This can cause distortion in the cut wafers. Finally, and most importantly, distortion of the side members 71 and 72 causes the bearing housings 65 to be cocked slightly relative to the rails 63 and 64, with the resultant position shown in FIG. 3 greatly exaggerated. This has the effect of greatly increasing the friction between the bearings 68 within the housings 65 and the respective rails 63 and 64. Furthermore, the constant, high speed reciprocation of the blade head 62 along the rails 63 and 64 causes the bearings 68 in the cocked bearing housings 65 to start to deteriorate the rails 63 and 64. The results can be gouged, roughened, scored, pitted and otherwise damaged side rails 63 and 64, as well as damage to the bearings 68 and housings 65, which further increases the bearing friction, finally resulting in a condition in which the bearing housings 65 and rails 63 and 64 need to be replaced altogether. The illustrated prior art rails 63 and 64, bearing housings 65 and bearings 68 are of a type manufactured by Thomson Industries, Inc. of Port Washington, N.Y. under the trademark "Super Ball Bearing".

Referring again to FIGS. 4-10, the inventive slurry saw 1 incorporates a number of different features to address the problems of blade head distortion.

First, referring particularly to FIGS. 5 and 6, the front cross member 12 is attached at right angles to a front cross member stiffener 90 via a plurality of through bolts 91. The stiffener 90 is preferably a steel plate which is machined to have a concave inward surface 93, shown greatly exaggerated in FIG. 5. The stiffener concave inner surface 93, which, by way of example, can have a radius of approximately 1608 inches, once the front cross member 12 is attached thereto and drawn into the concave surface 93, has the effect of preloading the front cross member 12 by giving it an initial positive outward radius. This prestressing of the front cross member 12 serves to partially compensate for the distortion introduced by the tensioning of the blade pack 44. FIG. 6 is an illustration (again greatly exaggerated) of the front cross member 12 after blade tensioning, illustrating how the positive outward radius has been changed to a negative inner radius by the forces introduced by blade tensioning. In comparing the inward bowing of the front cross member 12 with that of the prior art front cross member 73 of FIGS. 1 and 2, the inward bowing has been reduced by approximately one-half. Thus, by prestressing the front cross member 12 with the radiused stiffener 90, the distortion on the blade head 13 is considerably reduced. Further reductions in distortion effects on the blade head 13 may be possible with increased radiusing of the stiffener 90.

The side stiffeners 33 and 34, are attached at right angles to the respective side members 31 and 32 via a plurality of countersunk through bolts 101. Although only one such bolt 101 is illustrated, it is contemplated that at least three bolts 101 are provided with one positioned near the center and the others near respective opposite ends of each side stiffener 33 and 34. The side stiffeners 33 and 34 are similar to the stiffener 90, i.e. they are preferably steel plates, but the side stiffeners 33 and 34 are machined to have a convex inner surface 102, shown greatly exaggerated in FIG. 5. The stiffener convex inner surfaces 102, typically, have a radius somewhat less than the radius of the stiffener 90. Once the side members 31 and 32 are attached to the respective side stiffeners 33 and 34, they are bowed inward by the convex surfaces 102, thus preloading the side members 31 and 32 by giving them an initial negative inward radius. This prestressing of the side members 31 and 32 serves to partially compensate for the outward bowing distortion introduced by the tensioning of the blade pack 44. Again, referring to FIG. 6, an illustration (again greatly exaggerated) of the side members 31 and 32 show how the negative inward radius has been changed to a positive outer radius by the forces introduced by blade tensioning. With the inventive radiused side member stiffeners 33 and 34 in place, outward bowing of the side members 31 and 32 has been reduced by one-half or more than typical prior art unstiffened side members. As in the stationary front cross member 12, distortion of the blade head 13 is considerably reduced via the preloading provided by the side stiffeners 33 and 34. Again, further reductions in distortion effects on the blade head 13 may be possible with increased radiusing of the side stiffeners 33 and 34.

In order to further compensate for the distortion of the blade head 13, the inventive slurry saw 1 incorporates an improved rail and bearing system which includes the linear rails 26 and 27 and the bearing housings 35. The linear rails 26 and 27, as well as the bearing housings 35, are of the type manufactured by THK America, Inc. of Schaumburg, Ill. and called "LM Guide Type HSR-30R". These linear rails and bearing housings require precise alignment between the bearing housing and the rail, which is the reason they were not used in prior art slurry saws such as the saw 61 illustrated in FIGS. 1–3. The bearing housings 35 are attached to the control side member 31 via the control side bearing mounts 41, as described below.

Figure 7:
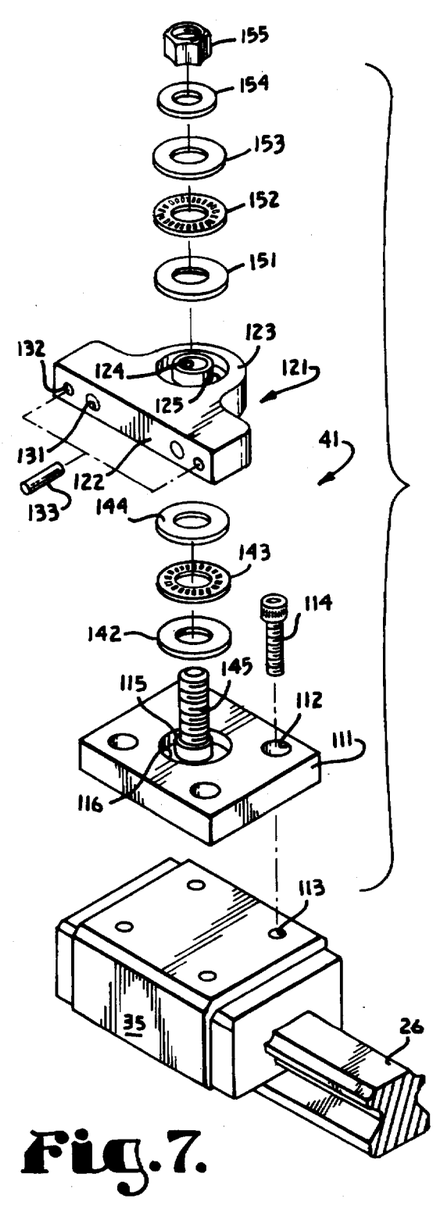
FIG. 7 is a greatly enlarged, exploded view of one of the slurry saw control side bearing housings and bearing housing attachments, with the bearing housing attached to a portion of the linear rail.
Figure 8:
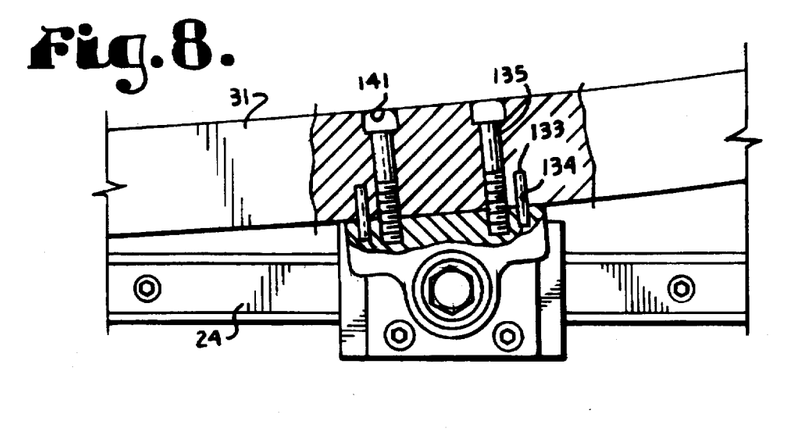
FIG. 8 is a greatly enlarged, fragmentary view of a portion of the slurry saw, showing one of the control side bearing housings during tensioning of the blade pack, with the housing shown partially broken away to illustrate the attachment to the control side member, and with the distortion of the blade head control side member shown greatly exaggerated for purposes of illustration.

FIG. 7 is an exploded view of one of the control side bearing mounts 41. Each control side bearing mount 41 includes a base plate 111 with a plurality of vertical, counterbored bores 112 therethrough and positioned to mate with respective threaded bores 113 in the bearing housing 35 to allow attachment of the base plate 111 to the bearing housing 35 via a like plurality of threaded bolts 114. The base plate 111 forms a central vertical bore 115 therethrough and a central annular channel 116 surrounding the central bore 115.

An upper plate 121 has a rectangular, flat portion 122 and a semicircular rounded portion 123. The semicircular portion 123 includes a central vertical bore 124 therethrough with an annular channel 125 surrounding the central bore 124. The rectangular portion 122 defines a pair of horizontal threaded bores 131 extending partially therethrough, with the longitudinal axis of the horizontal bores 131 being perpendicular to the longitudinal axis of the vertical central bore 124 in the semicircular portion 123. The rectangular portion 122 further defines outer horizontal circular cavities 132, the longitudinal axes of which are parallel to the longitudinal axes of the horizontal threaded bores 131. Guide pins 133 are secured in the outer horizontal cavities 132. The pins 133 are longer than the depth of the outer horizontal cavities 132 such that a portion of each pin 133 extends out of the outer horizontal cavities 132 to be received by mating circular cavities 134 (FIG. 8) formed in an outer side of the control side member 31 of the blade head 13. The horizontal threaded bores 131 receive respective threaded bolts 135 which extend through respective counterbored bores 141 extending through the control side member 31. A first thrust washer 142, a thrust bearing 143, and a second thrust washer 144 are, in that order, placed in the annular channel 116 in the base plate 111 surrounding a vertically oriented threaded bolt 145 which extends upward through the central vertical bore 115 in the base plate of the control side bearing mount. A third thrust washer 151, a second thrust bearing 152, and a fourth thrust washer 153 are, in that order, also placed in the channel 125 surrounding the central vertical bore 124 in the semicircular portion 123 of the upper plate 121.

In order to assemble the control side mount 41, the upper plate 121 is placed on top of the base plate 111 so that the central bore 124 surrounds the threaded end of the bolt 145 and a washer 154 and a nut 155, which can be nylon lined, are placed on the bolt 145 and the nut 155 is tightened to secure the base plate 111 to the upper plate 121. The assembled control side bearing mount 41 is then bolted to the bearing housing via the bolts 114 and is also bolted to the control side member 31 of the blade head 13 via the bolts 135 after alignment via the pins 133. Thus assembled, the upper plate 121 is rotatable relative to the base plate 111 via the thrust bearings 143 and 152 and thrust washers 142 and 144, 151 and 153, respectively, thus accommodating the bending and bowing of the control side member 31 during tightening of the blade pack 44.

It will be appreciated that in a typical reciprocating saw setup, as shown in FIGS. 4–6, there are two control side bearing housings 35, each of which is supplied with a control side bearing mount 41. Each of these control side bearing mounts 41 is constructed as set forth above and in the same manner as the other, and each is installed on the control side of the blade head 13 as set forth above and in the same manner as the other. Such mounts 41 are, of course, installed on the blade head 13 in cooperating locations, usually one near the front end of the blade head 13 and another near the rear of the blade head 13.

Figure 9:
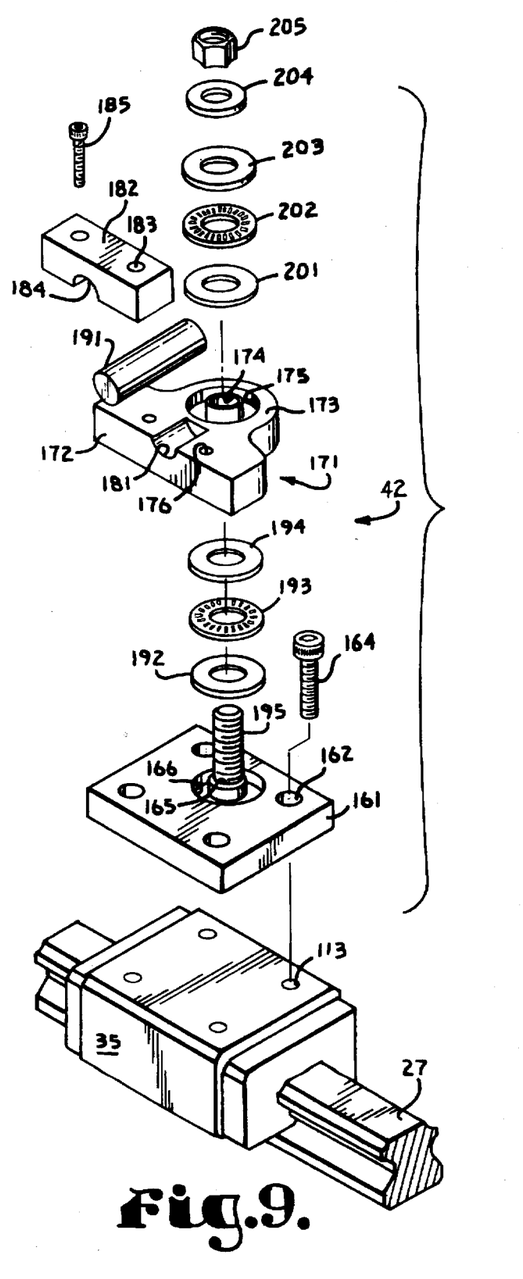
FIG. 9 is a greatly enlarged, exploded view of one of the slurry saw oil side bearing housings.

FIG. 9 is an exploded view of one of the oil side bearing mounts 42. Each oil side bearing mount 42 includes a base plate 161 with a plurality of vertical, counterbored bores 162 therethrough and positioned to mate with respective threaded bores 113 in the bearing housing 35 to allow attachment of the base plate 161 to the bearing housing 35 via a like plurality of threaded bolts 164. The base plate 161 forms a central vertical bore 165 therethrough and a central annular channel 166 surrounding the central bore 165.

A central plate 171 has a rectangular, flat portion 172 and a semicircular rounded portion 173. The semicircular portion 173 includes a central vertical bore 174 therethrough with an annular channel 175 surrounding the central bore 174. The rectangular portion 172 defines a pair of vertical threaded bores 176 extending therethrough, with the longitudinal axis of the vertical bores 176 being parallel to the longitudinal axis of the vertical central bore 174 in the semicircular portion 173. The rectangular portion 172 also defines a centrally located horizontal semicircular channel 181 opposite the semicircular portion 173 of the central plate 171. The longitudinal axis of the semicircular channel 181 is perpendicular to the longitudinal axis of the central vertical bore 174 in the semicircular portion 173 of the central plate 171.

An upper plate 182 is substantially rectangular and defines vertical counterbored bores 183 therethrough near respective opposite ends of its length, and also defines a centrally located horizontal semicircular channel 184, the longitudinal axis of which is between the vertical bores 183 and perpendicular to the longitudinal axes of the vertical bores 183. The vertical bores 183 are positioned on the upper plate 182 to cooperate and align with the threaded bores 176 in the central plate 171 for attachment thereto via a pair of threaded bolts 185. The semicircular channel 184 thus cooperates with the semicircular channel 181 in the central plate 171 to form a cylindrical channel for insertion and clamping of a sliding bearing 191. The sliding bearing 191 is cylindrical and is substantially longer than the semicircular channels 181 and 184 in the central and upper plates 171 and 182, respectively.

A first thrust washer 192, a thrust bearing 193, and a second thrust washer 194 are, in that order, placed in the annular channel 166 in the base plate 161 surrounding a vertically oriented threaded bolt 195 which extends upward through the central vertical bore 165 in the base plate of the oil side bearing mount 42. A third thrust washer 201, a second thrust bearing 202, and a fourth thrust washer 203 are, in that order, also placed in the channel 175 surrounding the central vertical bore 174 in the semicircular portion 173 of the central plate 171.

Figure 10:
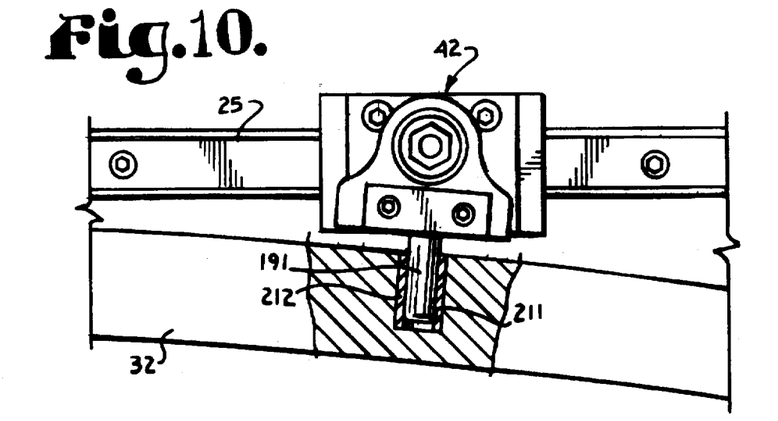
FIG. 10 is a greatly enlarged, fragmentary view of a portion of the slurry saw, showing one of the oil side bearing housings during tensioning of the blade pack, with the housing shown partially broken away to illustrate the attachment to the oil side member, and with the distortion of the blade head oil side member shown greatly exaggerated for purposes of illustration.

In order to assemble the oil side mount 42, the central plate 171 is placed on top of the base plate 161 so that the central bore 174 surrounds the threaded end of the bolt 195 and a washer 204 and a nut 205, which can be nylon lined, are placed on the bolt 195 and the nut 205 is tightened to secure the base plate 161 to the central plate 171. The sliding bearing 191 is positioned in the semicircular channel in the central plate 171 and the upper plate 182 is bolted atop the central plate 171 via the bolts 185, thus clamping the sliding bearing 191 in position. The assembled oil side bearing mount 42 is then bolted to the bearing housing 35 via the bolts 164 and is also mounted to the oil side member 32 of the blade head 13 by inserting the portion of the sliding bearing 191 which extends out from the oil side bearing mount 42 into a cavity 211 on the outside of the oil side member 32 of the blade head 13. A cylindrical sleeve 212 is positioned in the cavity 211 to minimize friction between the sliding bearing 191 and the oil side member 32. The oil side bearing mount 42 is thus able to float, i.e. it can slide horizontally inward and outward with respect to the cavity 211 in the oil side member 32. It should be noted, as shown in FIGS. 5, 6 and 10, that each oil side bearing mount 42 has its central bore 174, along with the bolt 195 and the nut 205 positioned off-center with relation to the rail 27. This is in contrast to the control side bearing mounts 41 whose central bore 124, along with the bolt 145 and nut 155 are positioned on the centerline of the rail 26. This eccentric positioning of the oil side bearing mount 42 is necessary in order to achieve sufficient leverage to allow the slide bearing 191, the base plate 161, the upper plate 182, and the central plate 171 to adequately support the oil side of the blade head 13.

So installed, the oil side bearing mount 42 can both rotate via the thrust bearings 193 and 202 and move toward and away from the oil side member 32 via the sliding bearing 191 so as to accommodate the bending and bowing of both the oil side member 32 and the control side member 31 as the blade pack 44 is tensioned in the blade head 13.

It will be appreciated that in a typical reciprocating saw setup there are two oil side bearing housings 35, each of which is supplied with an oil side bearing mount 42. Each of these oil side bearing mounts 42 is constructed as set forth above and in the same manner as the other, and each is installed on the oil side member 32 of the blade head 13 as set forth above and in the same manner as the other. Such mounts 42 are, of course, installed on the blade head 13 in cooperating locations, usually one near the front end of the blade head 13 and another near the rear of the blade head 13.

By the above described means and methods, when the blade pack 44 is tensioned and stretched in the blade head 13 of the saw 1, the bending, bowing, and distortion of the front cross member 12 and the oil and control side members 32 and 31 of the blade head 13 are substantially reduced, and any residual bending, bowing and distortion of the blade head 13 is accommodated and adjusted for by the inventive control side and oil side bearing mounts 41 and 42, respectively. Tests on the inventive saw 1 in comparison with prior saws, such as the saw 61 have resulted in marked reductions in power requirements for the motor 4, approaching a 50% reduction in power requirements due to the reduced friction between bearing housings 35 and rails 26 and 27. In addition, since the tensioning force is directed more on the blade pack 44 rather than toward bowing of the side members 31 and 32 and the front cross member 12, the blade pack 44 can be tensioned to a much tighter degree than permitted by prior art saws, such as the saw 61. This results in improved blade pack life and closer cutting tolerances.

It should be emphasized again, that the bowing and distortion of the prior art and inventive front cross members 73 and 12, respectively, and the prior art and inventive side members 71, 72 and 31, 32, respectively, have been greatly exaggerated for purposes of illustration. Typical distortion due to blade pack tensioning in a slurry saw such as the prior art saw 61 or the inventive saw 1 is on the order of 0.010–0.030 inches along the entire length of the cross or side member. It should also be noted that the inventive saw 1 can incorporate some or all of the inventive features described above, e.g. one or more of the front cross member stiffener 90 and the side stiffeners 33 and 34 can be eliminated, or included but not prestressed. Furthermore, compensating bearing mounts similar to the mounts 41 and 42 could be used with bearing housings and rails such as the housings 65 and rails 63, 64 described in the prior art saw 61.

It is thus to be understood that while certain forms of the present invention have been illustrated and described herein, it is not to be limited to the specific forms or arrangement of parts described and shown.

What is claimed and desired to be secured by Letters Patent is as follows:

1. A slurry saw including a blade head with a pair of opposing side members positioned on either side of a generally rectangular cutting area with a blade pack positioned within said cutting area, the blade head being attached to a plurality of bearing housings via respective bearing mounts, each said bearing housing being, in turn, attached to a respective one of a pair of spaced rails such that the blade head is supported by said bearing housings such that it can be linearly reciprocated along the rails, the improvement comprising:

at least one of said bearing mounts comprises a rotatable bearing mount having a first plate attached to a respective one of said blade head side members and a second plate attached to a respective one of said bearing housings, said first and second plates of said rotatable bearing mount being attached to each other such that they are rotatable with respect to each other.

2. A slurry saw as in claim 1, and further wherein at least one of said bearing mounts comprises a sliding bearing mount which is slidably mounted on a first of said side members such that the sliding bearing mount is reciprocally movable inward toward and outward away from said first side member.

3. A slurry saw as in claim 2, wherein each said sliding bearing mounts includes an outwardly extending sliding bearing sized and positioned to be received in a cavity in said first side member such that said sliding bearing is reciprocally movable within said cavity.

4. A slurry saw as in claim 2, wherein, each said sliding bearing mount includes a third plate sized and positioned for attachment to said first plate, said first and/or third plates including depressions for receiving said sliding bearing such that it is clamped between said first and third plates.

5. A slurry saw as in claim 1, wherein, each rotatable bearing mount includes a thrust bearing positioned between said first and second plates to reduce friction during relative rotation between said first and second plates.

6. A slurry saw as in claim 1, said saw further comprising a front cross member, a rear movable cross member, and a rear stationary cross member forming portions of said blade head, said blade pack being positioned in said cutting area between said front cross member and said rear movable cross member, wherein said improvement further comprises:

a front cross member stiffener including a plate with a first edge attached to said front cross member on a side of said front cross member opposite said cutting area and in a position such that said stiffener extends along at least a portion of said front cross member and is substantially orthogonal to said front cross member.

7. A slurry saw as in claim 6, wherein said front cross member stiffener first edge is radiused to provide a concave surface such that, when said front cross member is attached to said front cross member stiffener, said front cross member is prestressed by being bowed outward away from the cutting area.

8. A slurry saw as in claim 1, wherein said improvement further comprises:

a pair of side member stiffeners, each including a plate with a first edge attached to a respective one of said side members on the same side of said side member which is attached to said bearing mounts, each said side member stiffener being placed in a position such that it extends along at least a portion of the respective side member and is substantially orthogonal to the respective side member.

9. A slurry saw as in claim 8, wherein said side member stiffener first edge is radiused to provide a convex surface such that, when the respective side member is attached to the side member stiffener, the respective side member is prestressed by being bowed inward toward the cutting area.

10. A slurry saw including a blade head with a pair of opposing side members positioned on either side of a generally rectangular cutting area with a blade pack positioned within said cutting area, the blade head being attached to a plurality of bearing housings via respective bearing mounts, each said bearing housing being, in turn, attached to a respective one of a pair of spaced rails such that the blade head is supported by said bearing housings such that it can be linearly reciprocated along the rails, the improvement comprising:

at least one of said bearing mounts comprising a sliding bearing mount which is slidably mounted on a first of said side members such that the sliding bearing mount is reciprocally movable inward toward and outward away from said first side member.

11. A slurry saw as in claim 10, wherein each said sliding bearing mounts includes an outwardly extending sliding bearing sized and positioned to be received in a cavity in said first side member such that said sliding bearing is reciprocally movable within said cavity.

12. A slurry saw as in claim 10, wherein, each said sliding bearing mount includes a third plate sized and positioned for attachment to said first plate, said first and/or third plates including depressions for receiving said sliding bearing such that it is clamped between said first and third plates.

13. A slurry saw as in claim 10, and further wherein at least one of said bearing mounts is a rotatable bearing mount having a first plate attached to a respective one of said blade head side members and a second plate attached to a respective one of said bearing housings, said first and second plates of said rotatable bearing mount being attached to each other such that they are rotatable with respect to each other.

14. A slurry saw as in claim 13, wherein, each rotatable bearing mount includes a thrust bearing positioned between said first and second plates to reduce friction during relative rotation between said first and second plates.

15. A slurry saw as in claim 10, said saw further comprising a front cross member, a rear movable cross member, and a rear stationary cross member forming portions of said blade head, said blade pack being positioned in said cutting area between said front cross member and said rear movable cross member, wherein said improvement further comprises:

a front cross member stiffener including a plate with a first edge attached to said front cross member on a side of said front cross member opposite said cutting area and in a position such that said stiffener extends along at least a portion of said front cross member and is substantially orthogonal to said front cross member.

16. A slurry saw as in claim 15, wherein said front cross member stiffener first edge is radiused to provide a concave surface such that, when said front cross member is attached to said front cross member stiffener, said front cross member is prestressed by being bowed outward away from the cutting area.

17. A slurry saw as in claim 10, wherein said improvement further comprises:

a pair of side member stiffeners, each including a plate with a first edge attached to a respective one of said side members on the same side of said side member which is attached to said bearing mounts, each said side member stiffener being placed in a position such that it extends along at least a portion of the respective side member and is substantially orthogonal to the respective side member.

18. A slurry saw as in claim 17, wherein said side member stiffener first edge is radiused to provide a convex surface such that, when the respective side member is attached to the side member stiffener, the respective side member is prestressed by being bowed inward toward the cutting area.

19. A rotatable bearing mount for use in attaching a slurry saw blade head to a bearing housing, said bearing mount comprising:

a. a first plate attachable to said blade head; and
 b. a second plate attachable to said bearing housing, said first and second plates being attached to each other such that they are rotatable with respect to each other.

20. A rotatable bearing mount as in claim 19, and further comprising a thrust bearing positioned between said first and second plates to reduce friction during relative rotation between said first and second plates.

21. A rotatable bearing mount as in claim 19, wherein said rotatable bearing mount is slidably mounted on said blade head such that the bearing mount is reciprocally movable inward toward and outward away from said blade head.

22. A rotatable bearing mount as in claim 21, wherein said bearing mounts includes an outwardly extending sliding bearing sized and positioned to be received in a cavity in said blade head such that said sliding bearing is reciprocally movable within said cavity.

23. A laterally movable bearing mount for use in attaching a slurry saw blade head to a bearing housing, said bearing mount comprising:

a. attachment means for attaching said bearing mount to said bearing housing; and
 b. means for slidably mounting said bearing mount to said blade head such that the bearing mount is reciprocally movable inward toward and outward away from said blade head.

24. A laterally movable bearing mount as in claim 23, wherein said means for slidably mounting comprises an outwardly extending sliding bearing sized and positioned to be received in a cavity in said blade head such that said sliding bearing is reciprocally movable within said cavity.

25. A laterally movable bearing mount as in claim 23, said attachment means comprising:

a. a first plate attachable to means for slidably mounting; and
 b. a second plate attachable to said bearing housing, said first and second plates being attached to each other such that they are rotatable with respect to each other.

26. A laterally movable bearing mount as in claim 25, and further comprising a thrust bearing positioned between said first and second plates to reduce friction during relative rotation between said first and second plates.

27. A laterally movable bearing mount as in claim 25, wherein said bearing mount includes a third plate sized and positioned for attachment to said first plate, said first and/or third plates including depressions for receiving said sliding bearing such that it is clamped between said first and third plates.

28. A slurry saw including a blade head with a front cross member, a rear movable cross member, a rear stationary cross member, and a pair of opposing side members collectively forming a generally rectangular cutting area with a blade pack positioned within said cutting area between said front cross member and said rear movable cross member, the blade head being attached to a plurality of bearing housings, each said bearing housing being, in turn, attached to a respective one of a pair of spaced rails such that the blade head is supported by said bearing housings such that it can be linearly reciprocated along the rails, the improvement comprising:

a front cross member stiffener including a plate with a first edge attached to said front cross member on a side of said front cross member opposite said cutting area and in a position such that said stiffener extends along at least a portion of said front cross member and is substantially orthogonal to said front cross member.

29. A slurry saw as in claim 28, wherein said front cross member stiffener first edge is radiused to provide a concave surface such that, when said front cross member is attached to said front cross member stiffener, said front cross member is prestressed by being bowed outward away from the cutting area.

30. A slurry saw as in claim 28, wherein said improvement further comprises:

a pair of side member stiffeners, each including a plate with a first edge attached to a respective one of said side members on a side of said side member which is opposite to said cutting area, each said side member stiffener being placed in a position such that it extends along at least a portion of the respective side member and is substantially orthogonal to the respective side member.

31. A slurry saw as in claim 30, wherein said side member stiffener first edge is radiused to provide a convex surface such that, when the respective side member is attached to the side member stiffener, the respective side member is prestressed by being bowed inward toward the cutting area.

32. A slurry saw as in claim 28, wherein said improvement further comprises:

a plurality of bearing mounts equal in number to the plurality of bearing housings, each said bearing mount having a first plate attached to a respective one of said blade head side members on a side opposite said cutting area and a second plate attached to a respective one of said bearing housings, said first and second plates of each of said bearing mounts being attached to each other such that they are rotatable with respect to each other.

33. A slurry saw as in claim 32, wherein, in each bearing mount attached to a first of said side members, the first plate is attached to said first side member such that the bearing mount is reciprocally movable inward toward and outward away from said first side member.

34. A slurry saw as in claim 33, wherein, in each of said bearing mounts attached to said first side member, the first plate includes an outwardly extending sliding bearing sized and positioned to be received in a cavity in said first side member such that said sliding bearing is reciprocally movable within said cavity.

35. A slurry saw as in claim 33, wherein, each of said bearing mounts attached to said first side member includes a third plate sized and positioned for attachment to said first plate, said first and/or third plates including depressions for receiving said sliding bearing such that it is clamped between said first and third plates.

36. A slurry saw as in claim 32, wherein, each bearing mount includes a thrust bearing positioned between said first and second plates to reduce friction during relative rotation between said first and second plates.

37. A saw including a blade head which is supported by and reciprocates on spaced rails via bearings contained in a plurality of bearing housings mounted to said blade head by a respective plurality of bearing mounts, the improvement comprising:
   a. at least one of said bearing mounts having a first part fixedly attached to a respective one of said bearing housings and a second part fixedly attached to said blade head; and
   b. said first part being rotatably secured to said second part to permit said second part to rotate with respect to said respective bearing housing.

38. In a saw including a blade head which is supported by and reciprocates on spaced rails via bearings contained in a plurality of bearing housings mounted to said blade head by a respective plurality of bearing mounts, the improvement comprising:
   at least one of said bearing mounts being fixedly attached to a respective one of said bearing housings and slidably secured to said blade head to permit said blade head to move toward and away from said bearing mount.

39. The saw of claim 38 wherein said at least one bearing mount comprises:
   a. a first part fixedly attached to said respective bearing housing; and
   b. a second part slidably secured to said blade head to permit said blade head to move toward and away from said respective bearing mount.

40. The saw of claim 39 wherein said at least one bearing mount first part is rotatably secured to said second part to permit said second part to rotate with respect to said bearing housing.

* * * * *